US008483774B2

(12) United States Patent
Biddy, Jr. et al.

(10) Patent No.: US 8,483,774 B2
(45) Date of Patent: Jul. 9, 2013

(54) CELL PHONE REMOTE RINGER

(76) Inventors: Fred Douglas Biddy, Jr., Burlington, NC (US); Rebecca Lynn Biddy, Burlington, NC (US)

( * ) Notice: Subject to any disclaimer, the term of this patent is extended or adjusted under 35 U.S.C. 154(b) by 439 days.

(21) Appl. No.: 12/368,730

(22) Filed: Feb. 10, 2009

(65) Prior Publication Data

US 2010/0203927 A1 Aug. 12, 2010

(51) Int. Cl.
*H04M 1/00* (2006.01)

(52) U.S. Cl.
USPC .......... 455/567; 455/419

(58) Field of Classification Search
USPC .......... 455/567, 410, 412.1, 419, 420
See application file for complete search history.

(56) References Cited

U.S. PATENT DOCUMENTS

| | | | | |
|---|---|---|---|---|
| 5,848,362 | A * | 12/1998 | Yamashita | 455/567 |
| 6,243,593 | B1 * | 6/2001 | Zicker | 455/426.1 |
| 6,993,363 | B1 * | 1/2006 | Hsu | 455/567 |
| 7,130,664 | B1 * | 10/2006 | Williams | 455/567 |
| 7,133,700 | B2 * | 11/2006 | Benco et al. | 455/566 |
| 7,565,115 | B2 * | 7/2009 | Alexis | 455/74.1 |
| 7,761,091 | B2 * | 7/2010 | Dunn et al. | 455/419 |
| 2005/0266891 | A1 * | 12/2005 | Mullen | 455/567 |
| 2006/0194608 | A1 | 8/2006 | Lemke | |
| 2007/0265038 | A1 * | 11/2007 | Kim | 455/567 |
| 2009/0156267 | A1 * | 6/2009 | Narayanaswami et al. | 455/567 |

* cited by examiner

*Primary Examiner* — James H Cho

(74) *Attorney, Agent, or Firm* — James G. Passé; Passé Intellectual Property, LLC

(57) ABSTRACT

The present invention relates to a device system and method for providing a remote product which notifies a cell phone user that his cell phone is receiving a call in order to answer the cell phone when it is out of hearing range or otherwise turned off or out of cell range. By utilizing a separate call notification device, the device can be positioned to receive a cell call indication in a situation or place where the cell phone might not.

5 Claims, 2 Drawing Sheets

CELL PHONE REMOTE RINGER

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to a method of providing notification when a cell phone is receiving a phone call. In particular the present invention relates to remote notification from a fixed notification device to notify a cell phone user when the cell phone is ringing even if the cell phone is out of range or otherwise turned off.

2. Description of Related Art

The use of cell phones has revolutionized telephone service. It is now possible to receive a telephone call wirelessly almost anywhere in the United States and most foreign countries. One particular problem exists with cell phones however. Notification of an incoming call is by a notification device within the cell phone such as a ringer or in some cases vibration devices but, because there is only a single cell phone with a particular phone number it is easy to be in a building such as a house and the phone be someplace out of hearing range. In addition, many buildings have poor cell phone reception and even if the phone is close to the user, the phone may not get proper reception unless it is situated, for example, at an inside periphery of a building where there is a usable cell phone signal.

This problem is exacerbated in households and offices with multiple cell phones. The ability to be informed when a cell phone is ringing in such a situation has been a severe limitation in the use of cell phones. Some remote devices have been suggested or introduced but they essentially rely on a signal from the cell phone itself. They are, of course, useless in the condition where there is no signal to the phone or the phone is off.

In US patent application 2005/0266891 published Dec. 1, 2005 to Mullen there is described a remote notification for use of a cellular phone. In the disclosure it is taught that a sensing device is provided on the cellular phone that communicates/routes an alert to a remote notification device. It is designed primarily to notify a woman who has her cell phone in her purse and is primarily a short range transmitter.

BRIEF SUMMARY OF THE INVENTION

The present invention relates to a novel device which solves the problems above and provides other benefits which shall become obvious upon understanding of the invention. In particular, it provides a remote notification device for one or more cell phones that can be placed in a remote location from the one or more cell phones and provides notification to a cell phone user(s) in the event the cell phone is not near the user.

In one embodiment, the invention relates to a device for providing remote notification of an incoming call on one or more cellular phones separate from each of the phones consisting essentially of:

a) a receiving device for detecting the signal indicating a phone call is being sent to the one or more cellular phones;

b) a means for powering the remote detection device; and c) a notification device in communication with the receiving device for producing a notification signal to a user of the device when one or more of the phones are detected to be receiving a phone call.

In another embodiment, the invention relates to a system for providing remote notification of an incoming call on one or more cellular phones separate from each of the phones consisting essentially of:

a) a receiving device for detecting when a phone call is being sent to the one or more cellular phones;

b) a notification device, in communication with the receiving device, for producing a notification signal to a user of the device when one or more of the phones are detected to be receiving a phone call; and c) a means for powering the receiving device and the notification device.

In yet another embodiment, the invention relates to a method for providing remote notification of an incoming call on one or more cellular phones consisting essentially of:

a) selecting a remote detection device consisting essentially of:

i. a receiving device programmed to detect when a phone call is being sent to the one or more cellular phones by being able to receive the signal that indicates an incoming cell phone call for the one or more numbers;

ii. a means for powering the remote detection device; and iii. a notification device in communication with the receiving device for producing a notification signal to a user of the device when one or more of the phones are detected to be receiving a phone call;

b) engaging the means for powering the remote detection device;

c) positioning the remote detection device in a select location that can receive the cell phone signal;

d) causing the receiving device to communicate with the notification device in order to activate the notification device when there is an incoming cell phone call detected by the receiving device.

DETAILED DESCRIPTION OF THE INVENTION

Figure 1:
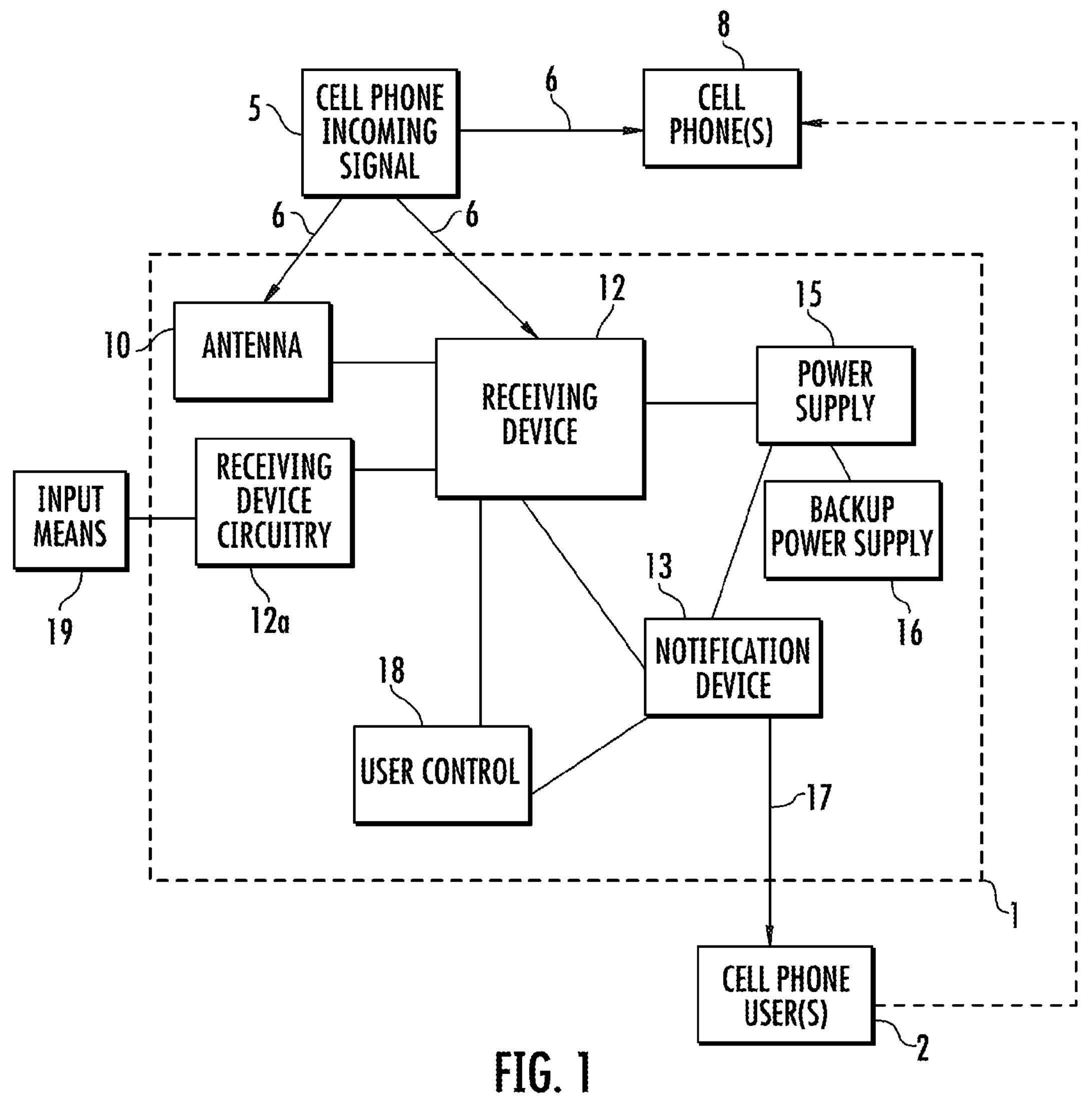
FIG. 1 is a schematic diagram of an embodiment of the present invention remote cell phone notification device.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the "device for providing remote detection" of an incoming call for a cellular phone, refers to a device which is not a cell phone (i.e. where the call cannot be answered) but is capable of detecting a phone call for a particular cell phone or multiple cell phones using a receiving device. Each cell phone has a unique digital signature that identifies a cell phone. When a call signal is sent out, the call signal has encoded within the signal an identifier for that particular cell phone. A cell phone contains such circuitry but in addition contains a device for engaging the signal and answering the phone call. The device of the present invention is not capable of performing the call answering function. It can, however, be programmed such that a receiving device is able to detect a plurality of different cell phones merely by programming the appropriate information into a cell phone signal detector. Such devices are known for single phones and multiple detectors can be programmed into a receiving device by one skilled in the art in view of this disclosure, for example, by including multiple receivers and multiple notification devices. While this circuitry is known, it is normally a part solely of cell phones and not produced as a standalone device. In addition they are not normally programmed to receive multiple call detection services.

The receiving device must have a powered circuit. Because the receiving device is designed to be stand alone and not designed to be a portable device but rather function in a particular fixed location, the power source in one embodiment is by AC current. While the device could of course have a battery, especially, as a backup means to power the receiving device, it has greater utility having a primary AC power source. This way, there is no need, such as with the cell phone to monitor recharging. This works primarily because the receiving device and the present invention are designed to utilize the device in a fixed location unlike the cell phone. The receiving device thus can be placed at a location, for example, indoors, where a cell phone signal is always capable of being received. This might be near a window or an outer wall. The receiving device could have either an internal antenna or an external antenna. An internal antenna makes use easier but an external antenna would allow remote and extreme remote placement of the antenna, for example, outdoors while the receiving device remains indoors. One example of use would be to place the receiving unit in the family room and the antennae positioned on the roof. Then the receiving device is positioned where, in many houses, there is no signal what so ever since many houses only have signal near the outer walls or in some cases nowhere inside. Another method of receiving the signal might be from another source such as by radio signal or receiving cell phone notification via the internet either by wire or wireless. As an alternate method for detecting the signal indicating a phone call is being sent to the one or more cellular phones, the receiving device could be built into a computer and the cell phone signal detected by an antennae in the computer or by receiving an alternate signal over the internet that a standard signal is being sent.

Once a cell phone call signal indicating a call is coming in (either from the normal signal or say from the internet), the device must be in communication with a notification device and notify the device it has received such signal. The notification can be by wired or wireless means to a notification device. The notification device receives a signal either wired or wirelessly from the receiving device and then in response produces a notification signal for a user to indicate that the cell phone connected with the signal is in the process of receiving a phone call. The notification signal can be a visual or auditory signal such as a blinking light or a standard ring or alarm, as desired. The receiving device can be a part of the entire detection device as one device or can be separate from the receiving device. Where wireless connection exists, the notification device can be positioned at a remote location. If a remote device though the notification device must be powered separately, once again, AC power provides a device that will not run out of charge, such as in the case of the cell phone. Where wireless, it can be placed anywhere and such notification devices can be plural in nature and can handle multiple phone calls for multiple phones. In the case of multiple phones, distinctive notification signals can be employed so the identity of which of a plurality of phones is receiving a phone call. With use of the remote notification device, the remote notification device can easily be placed where notification is necessary while the receiving device is positioned where signal is easiest to obtain. While the user cannot answer the phone call using the present device, it can be used to know when to go find the phone or move it to a location that can receive the call or at worse, to go return the call. The present invention can be equipped with other means that enhance the detection of the phone call (but not the actual answering of the call). Things such as caller ID, time, and the like could be added within the scope of the invention. By not including a means for answering the call the device would not accidently take the call or interfere with many location's rules against multiple phones with the same number. In addition, the present device provides a way to boost the ability to receive the call without involving the phone or its location and since it can be used with multiple phones or reprogrammed, the present device can be used with successive phones or phone numbers. A satellite notification device could also be used where there is just one notification device but that device sends a signal to another satellite device to produce a notification signal.

Unlike a cell phone which is prohibited from having booster or relay devices, the present invention would be able to relay the signal, for example, in a larger building so that notification could be accomplished in multiple locations or in an activatable location. This might easily be accomplished where the notification device is also in a computer or speakers associated with a computer, however, that is not a limitation of the present invention. One skilled in the art could easily produce the receiving and notification device as arranged with the present invention.

In the method of the invention, the cell phone would be in the process of receiving a phone call. The normal cell phone signal or a substitute signal would be received by the receiving unit programmed for recognizing a call is being received for one or more specific cell phones programmed into the device on a permanent or reprogrammable basis. The receiving unit would have previously been positioned such that it can receive a signal all the time by positioning the unit or antennae in a place which always receives a signal or in other embodiments by sending a substitute signal, such as a signal over the internet. Once the signal is detected by the receiving unit, it sends a separate signal to the notification device(s) wired or wirelessly. Once the notification is received, the one or more notification devices produce a notification signal(s) so that a user is aware of the incoming call. A light or a ring tone or the like is used. Preferably distinct from the cell phone ring but not necessarily. Once the notification signal is detected by one or more cell phone users visually or acoustically, the user can choose in a normal manner how to deal with the cell phone call. Once again, the present advantage has the ability to notify a cell phone user of a cell phone call even under circumstances where the cell phone is not working (in the off position, discharged or broken) or is not in a position to receive a cell phone signal such as in the interior portions of many houses and buildings.

Now referring to the figures of the present invention FIG. 1 is graphic representation of an embodiment of the present invention the remote detection device 1 for remotely receiving notice of a cell call and notifying a cell phone user(s) 2. A cell phone incoming signal 5 is delivered from a nearby cell phone tower. It sends a signal 6 to the corresponding cell phone 8, as well as the present remote device 1. The incoming signal 5 can be sent to an antenna 10 (which while depicted inside remote device 1 could be positioned as a separate device. It would then send the signal to the receiving device 12. It could also send a signal directly to the receiving device 12. If cell phone user 2 is close to the cell phone and hears the cell phone 8 ring. The user 2 could answer the phone normally. In the case where the user 2 is in a remote location the remote detection device 1 is used. Upon the receiving device 12 receiving signal 6 from whatever source it so receives the signal 6, it can then send a signal to the notification device 13, which it is in communication with wired or wirelessly. The receiving device 12 has AC power supply 15 and backup battery supply 16 to power the entire device, including the receiving device 12 and the notification device 13.

The notification device 13 upon receiving the communication from the receiving device 12 then sends a notification signal 17 to the user. The user 2 is thus notified that there is an incoming call and the user can interact with the cell phone 8 as desired.

Also, as indicated, in this embodiment there is a user control 18. The user control can be one or more means for affecting desired results from the remote device 1. Things such as volume controls, on/off switch, the ability to change notification means, the ability to selectively turn on and off one or more cell phone notification and the like as optional features can all be handled by the user control 18. Either through the user control 18 or separate input means 19, the cell phones can interact with the receiving device circuitry 12*a*. This interaction can be for programming or reprogramming the cell phone and signal to be detected or other functions necessary to be programmed into the device.

Figure 2:
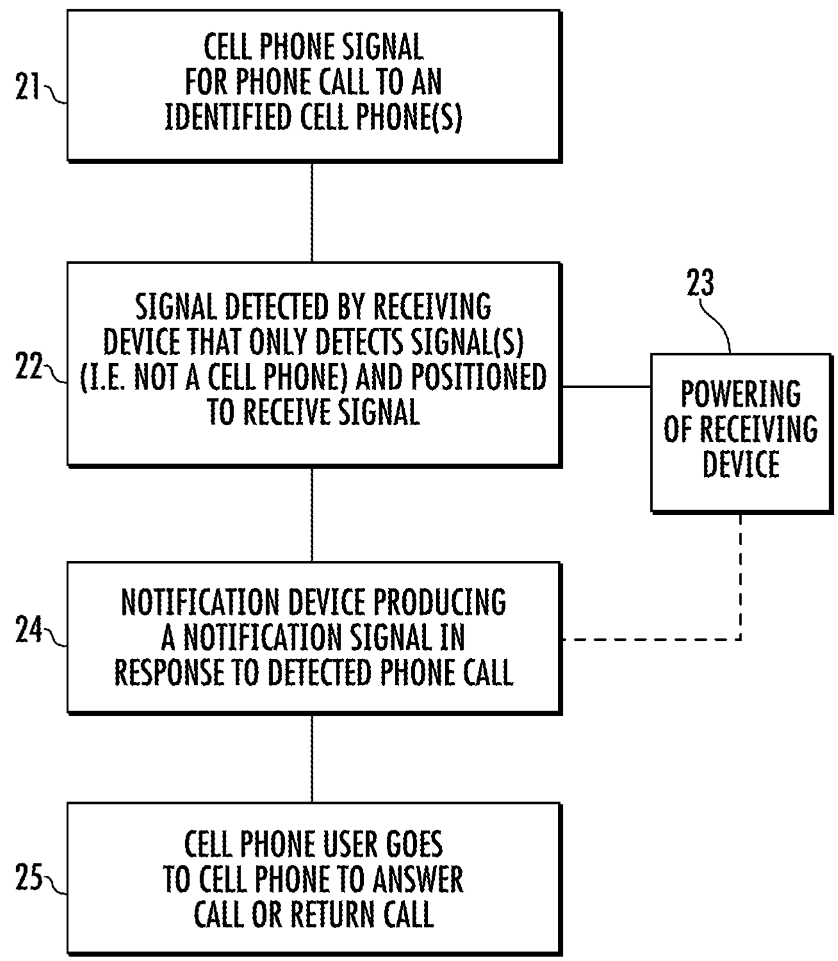
FIG. 2 is a flow chart of an embodiment of the present invention.

FIG. 2 is a flow chart of an embodiment of the method of the present invention. The first thing that happens is a cell phone signal for a phone call is sent to an identified cell phone 21. Once that occurs, the signal (or an alternate signal such as over the internet) is detected by the receiving device in the remote notification device that only detects the signal(s) (i.e. not a cell phone) and positioned to receive the signal 22. The receiving device and optionally notification device is powered 23.

A notification device in communication with the receiving device sends out a notification signal in response to the detected phone call 24. Once again the notification device can be powered 23. Once the notification device sends out the notification signal, the cell phone user, if the notification is received, goes to the cell phone to answer or receive the phone call 24 or does whatever is desired with the notification information.

Once again, the cell phone can be in any convenient or inconvenient place or condition and the device acts to notify the cell phone user without acting as a cell phone or other answering device. It is clear that the utility of this device is based on the need for occasional remote notification of an incoming cell phone call by a backup notification means that does not rely on position of the cell phone, its physical working condition or state of charge to function to assist the user. This is accomplished without a second cell phone or other portable device that is not allowed by current cell phone regulations.

It is clear from the disclosure herein that the examples and embodiments described are not intended to be limiting. While the present invention is limited to non cell phone type devices, the device can easily be constructed with the present disclosure and examples along with other modifications and the claims which follow are not intended to be limited by the embodiments or any examples.

What is claimed is:

1. A device for providing a user remote detection and notification of an incoming cell phone call signal being sent to one or more cell phones, when the one or more cell phones cannot alert the user of the incoming cell phone call signal, the cell phone is set to not ring or the cell phone is turned off consisting essentially of:

a) a detecting device for detecting the cell incoming phone call signal indicating an incoming cell phone call signal is being sent to the one or more cell phones when the one or more cell phones cannot alert the user of the incoming cell phone call signal, the cell phone is set to not ring or the cell phone is turned off, the detecting device being separate from the one or more cell phones and positioned in a place which always receives the incoming phone call signal or a substitute incoming phone call signal, wherein the device can determine when a cell phone call signal is being sent to a plurality of cell phones and wherein the device is equipped with caller ID function;

b) a means for powering the device;

c) one or more acoustic notification devices in communication with the detecting device for producing a notification signal to the user of the device when one or more of the cell phones are detected to be being sent an incoming cell phone call signal; and d) wherein the one or more notification devices receive a signal from the detecting device wirelessly.

2. A device according to claim 1 wherein the device is powered primarily by AC current.

3. A device according to claim 1 wherein there is a distinctive notification signal for each cell phone.

4. A device according to claim 1 wherein the device can be activated for a particular cell phone independent of other cell phones on the device.

5. A device according to claim 1 wherein the user is not in a position to receive a cell phone signal.

* * * * *